US007788949B2

(12) United States Patent
Huston et al.

(10) Patent No.: US 7,788,949 B2
(45) Date of Patent: Sep. 7, 2010

(54) CLOSED-CELL FOAM SILICA

(75) Inventors: Alan L. Huston, Aldie, VA (US); Brian I. Justus, Springfield, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 539 days.

(21) Appl. No.: 11/798,976

(22) Filed: May 18, 2007

(65) Prior Publication Data

US 2008/0286555 A1 Nov. 20, 2008

(51) Int. Cl.
*C03B 19/08* (2006.01)
*C04B 38/10* (2006.01)

(52) U.S. Cl. .............................. 65/22; 501/80; 501/84; 501/85

(58) Field of Classification Search .................. 65/22; 501/80, 84, 85
See application file for complete search history.

(56) References Cited

U.S. PATENT DOCUMENTS 2,890,127 A * 6/1959 Ford ............................ 501/39
3,459,565 A * 8/1969 Jones et al. ................... 501/39
3,574,583 A * 4/1971 Goldsmith .................... 65/22
4,430,108 A * 2/1984 Hojaji et al. .................. 65/22

OTHER PUBLICATIONS

VYCOR Brand Porous Glass 7930. © 2001, Corning Incorporated.*

* cited by examiner

*Primary Examiner*—Khanh Nguyen
*Assistant Examiner*—Carson Gross
(74) *Attorney, Agent, or Firm*—Amy Ressing; Stephen T. Hunnius

(57) ABSTRACT

A method of making a closed-cell silica foam glass is provided which can include diffusing a substance into a porous glass substrate to form an impregnated substrate, sealing the impregnated glass substrate and heating to a first temperature, wherein the pressure is greater than one atmosphere, heating the container to a second temperature, wherein the second temperature is higher than first temperature, removing the solid glass, non-porous substrate, and heating the solid glass, non-porous substrate to a third temperature to soften the solid glass, non-porous substrate and thereby expand the solid glass, non-porous substrate. A closed-cell silica foam product is provided which can have a closed-cell structure and high temperature insulating property.

18 Claims, 2 Drawing Sheets

CLOSED-CELL FOAM SILICA

BACKGROUND

The present invention relates to foam glass and more specifically to closed-cell foam silica.

Foam glasses are widely used in industry as lightweight, insulating materials. An example of a foam glass is Pittsburgh Corning FOAMGLAS (registered trademark). This material is composed of millions of individually sealed, micron-sized cells. This is called a closed-cell structure and offers a number of advantages over open cell foam glass structures.

Open cell foam glass structures can absorb moisture and other chemicals, greatly reducing the insulating efficiency of the foam glass. If an open cell foam glass absorbs a flammable material, it can act as a candle wick and can represent a serious fire hazard. If an open cell structure absorbs a corrosive chemical, the large surface area of the open cells can result in rapid corrosion.

Closed cell structures are largely impermeable to most liquids and gases and thus can be moisture-resistant and corrosion-resistant. For example, FOAMGLAS (registered trademark) can be used for outdoor and underground applications and can operate at temperatures up to 480 C.

Foam glasses are typically made using alkali metal silicate glasses. These glasses are fabricated by mixing, for example, alumina, boric acid, small silica particles and an alkali metal oxide with a cellulating agent to form a pulverulent homogeneous mixture as discussed in U.S. Pat. No. 4,192,664, the entire contents of which is herein incorporated by reference. The mixture is heated to a temperature that causes the cellulating agent to gasify, or vaporize, forming a foam glass with a cellular structure.

Although closed-cell foam glasses with high silica content are desirable, only open cell foam glasses having high silica content are typically reported as in U.S. Pat. No. 3,945,816, the entire contents of which is herein incorporated by reference. This foam silica was prepared by first fabricating a foam phase-separable alkali metal borosilicate glass, then heat treating the foam to separate the silica-rich and boron-rich phases, and finally leaching the boron-rich phase away using an acid etchant.

Open-cell foam silica can also be made using sol-gel techniques. This involves cooling of the liquid to cause gellation and phase separation followed by supercritical drying to remove the solvent and produce an open cell structure.

DETAILED DESCRIPTION

Figure 1:
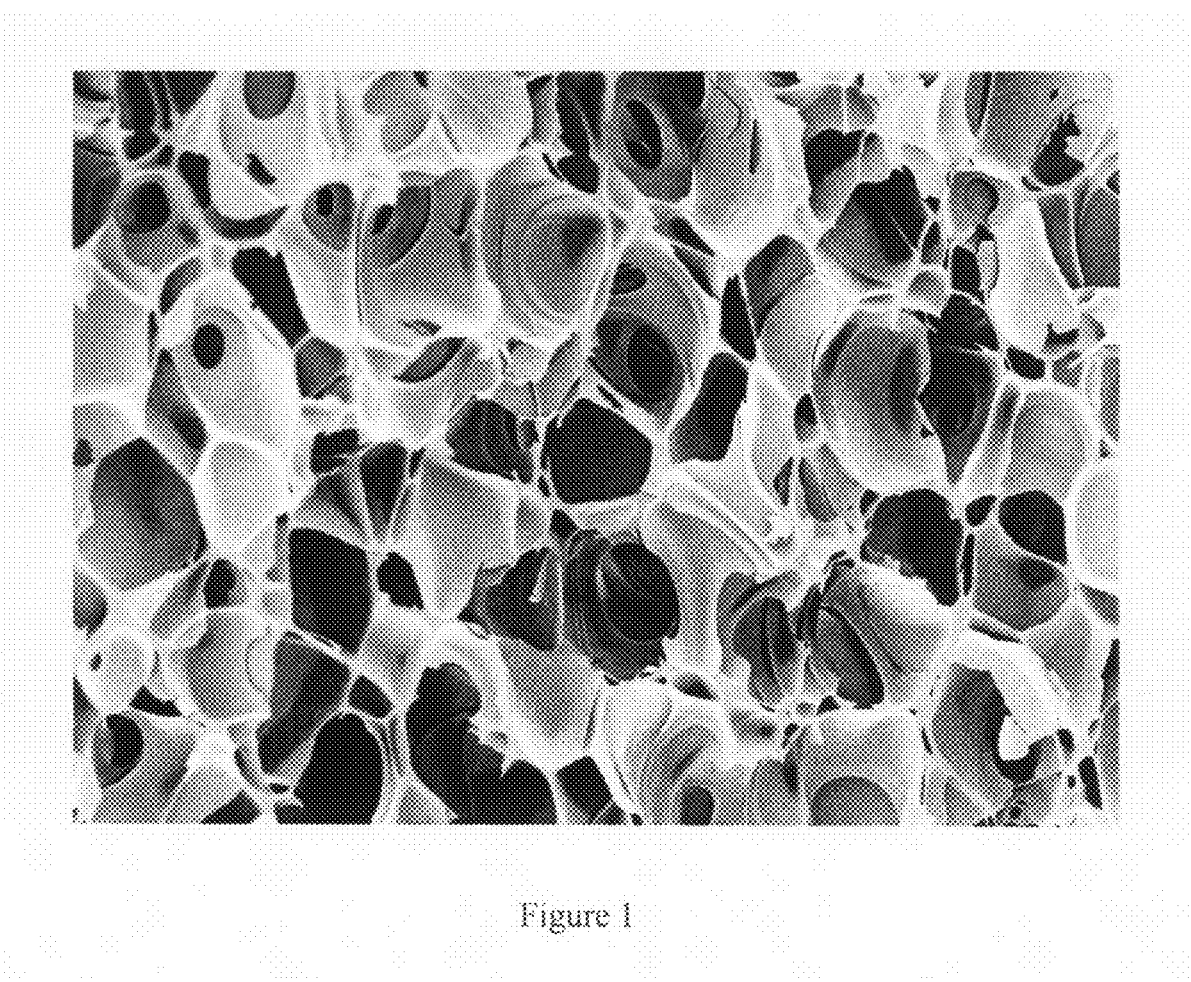
FIG. 1 shows a SEM micrograph of the cell structure of the glass at 542× magnification.
Figure 2:
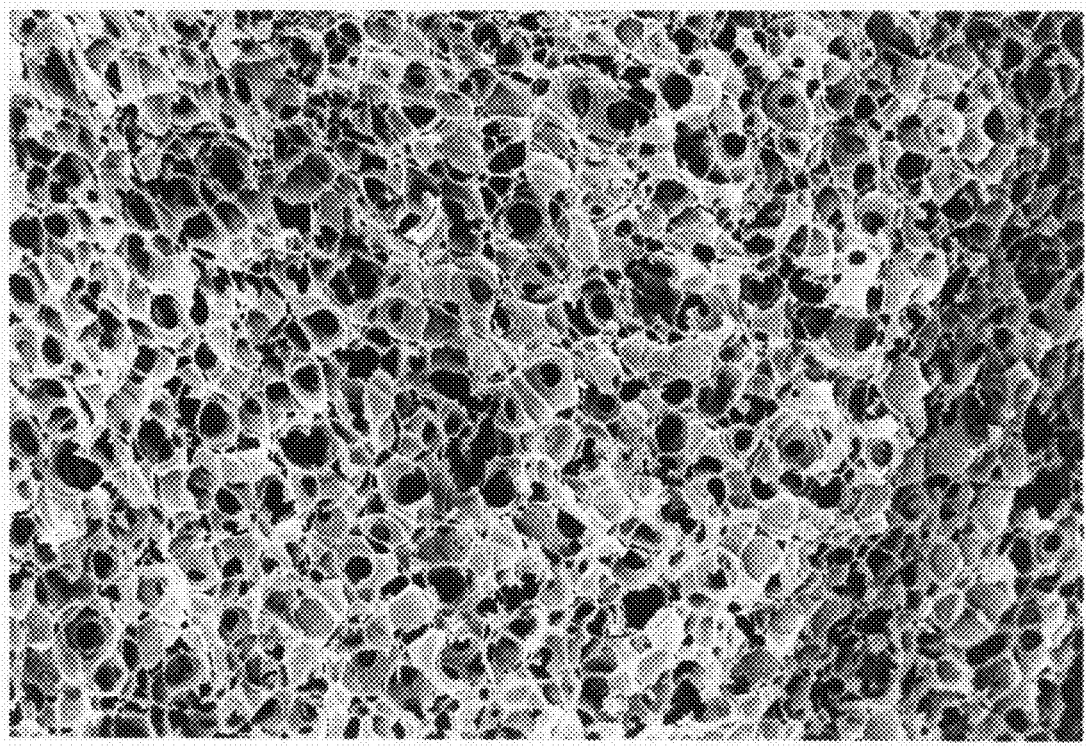
FIG. 2 show a SEM micrograph of the cell structure of the glass at 162× magnification.

The closed-cell foam glass structure can consist of a multitude of micron-sized voids enclosed by interconnected glass membranes with sub-micron thickness. The closed cell foam glass structure can have a composition that is greater than 95% $SiO_2$. The voids within the closed cell foam glass structure can represent greater than 70% of the volume of the structure.

The method of manufacture of closed-cell silica foam is described in detail in this section. The method can be subdivided into five steps: 1: diffusion of a substance into a porous glass substrate to form an impregnated substrate, said substance being capable of forming a gas upon heating; 2: sealing said impregnated glass substrate inside of a container; 3: heating the sealed container to a first temperature sufficient to cause the impregnated substance to form a gas to create a pressure inside of the sealed container that is greater than one atmosphere; 4: heating the sealed container to a second, higher temperature sufficient to cause the pores within the porous glass to collapse resulting in trapping or sealing the gaseous substance within the formerly porous substrate resulting in a solid, non-porous glass substrate, 5: removal of the solid glass substrate from the sealed container and heating the solid glass substrate to a temperature sufficient to soften the glass causing expansion of the glass due to the expansion of trapped gasses within the solid glass substrate.

EXAMPLE 1

An example of one method for the fabrication of foam silica is outlined in detail.

An example of Step 1—An example of the step of incorporation of inorganic salts throughout a porous silica substrate is provided. The preparation of the foam glass can begin with the diffusion of an inorganic salt such as calcium nitrate tetrahydrate ($Ca(NO_3)_2.4H_2O$) into a porous glass substrate. A commercially available porous glass (Corning 7930) can be used that consists of a network of interconnected pores with diameters of approximately 40 A and a void volume of approximately 30%.

Step 2—The $Ca(NO_3)_2.4H_2O$ impregnated glass can be dried and then sealed inside of a fused quartz tube that is similar in size to the porous glass substrate.

An example of Step 3—The temperature can be slowly raised to approximately 600 C. The $Ca(NO_3)_2.4H_2O$ decomposes to $Ca(NO_3)_2$. at a temperature of 132 C, releasing water vapor. At a temperature of 561 C the $Ca(NO_3)_2$ melts and further heating leads to decomposition to form CaO and various nitrogen oxide gasses. The gasses released during the heating process can cause the pressure inside of the sealed container to reach several atmospheres.

Step 4—Further heating to a temperature of approximately 850 C causes the pores in the glass to begin to collapse (referred to as consolidation) trapping the high pressure gasses in the glass. Heating to a temperature of about 1100 C assures that the porous glass substrate is fully consolidated. The sample can then cooled to room temperature and then removed from the sealed container. The consolidated glass can be slightly smaller in volume than the starting porous glass.

An example of Step 5—A step of expansion at elevated temperature to yield a closed-cell silica foam is provided. The consolidated glass can be then placed inside of an oven and the temperature can be raised to 1100 C. As the glass begins to soften, the trapped gasses in the glass can expand causing the glass to expand, forming a closed-cell foam structure. The resulting "foam glass" can have the appearance of white chalk and can have a bulk density of less than 0.3 $g/cm^3$.

Various factors such as the internal pressure, the external pressure and the temperature can determine the final cell structure and density of the glass.

The specific example given above of the five-step method for the fabrication of foam silica glass is only meant to be illustrative of the general method. Many other specific approaches can also be used.

EXAMPLE 2

An example of a second method for the fabrication of foam silica is outlined in detail.

A solution was prepared containing 1.0 g $Zn(NO_3)_2 \cdot 5H_2O$ in 100 ml of water with 1 ml concentrated $HNO_3$. A 0.25 inch diameter by 3 inch long rod of porous Vycor glass (Type 7930) was placed in the solution for a period of 24 hours to allow complete diffusion of the solution throughout the glass rod. The rod was removed from solution and allowed to dry in air for a period of 24 hours.

A second solution containing 2 grams of thioacetamide in 100 ml of solution plus 1 ml of concentrated $HNO_3$ was prepared and heated to approximately 100 C. The rod containing the $Zn(NO_3)_2$ salt was then placed into the solution for a period of 3 hours to allow the $Zn(NO_3)_2$ to react with the $H_2S$ that was formed by the decomposition of thioacetamide, forming nanocrystallites of ZnS.

The rod containing the ZnS nanocrystallites was removed from solution and dried for approximately 24 hours in air. The rod was then placed in a furnace and heated 100 C and maintained for 24 hours for complete drying. The ZnS-doped rod was then placed in a thick-walled fused quartz tube, approximately 0.5 inches ID and 8 inches long that was sealed at one end.

The tube was then evacuated to a pressure of a few millitorr and sealed using a hydrogen-oxygen torch. The sealed tube containing the doped rod was then placed inside a furnace and raised to a temperature of 1150 C at a rate of 5 C per minute and held at 1150 C for a period of approximately 1 hour. The sealed tube was allowed to cool to room temperature and the doped rod was removed from the tube by cutting the tube.

The doped rod now had an opaque whitish-gray appearance with dimensions slightly smaller than the starting porous glass rod which was due to the consolidation of the pores at the elevated temperature. The density of the rod was approximately 2 $g/cm^3$. The rod was then placed inside of the furnace and the temperature was raised to 1150 C for 10 minutes. During this heating process, the rod expanded in all directions resulting in a low density (~0.3 $g/cm^3$), cylindrical, white glass material that had the appearance of styrofoam or chalk.

EXAMPLE 3

An alternative method for the expansion of the foam glass can involve rapidly expanding the consolidated, formerly porous, glass at a temperature of 1100 C. Instead of cooling the fused quartz container, the container can be fractured at high temperature. The sudden drop in pressure results in a very rapid expansion of the consolidated rod. This method of expansion results in a smoother, more uniform appearance of the surface of the foam glass.

As previously noted, a method of manufacture of foam silica as taught in this disclosure can provide a closed-cell structure. A closed-cell structure can be critical for providing moisture-resistance and corrosion-resistance. No other glass foams with high silica content have a closed-cell structure. The cell membranes can be very thin and the cell diameters can range in size from less than 1 micron to more than 20 microns.

Also as previously noted, a foam glass made primarily from silica can be used to thermally protect materials from much higher temperatures than alkali silicate glass foams. Silica foam can be used at temperatures above 800 C while silicate glass foams can only be used to ~480 C.

The above description is that of a preferred embodiment of the invention. Various modifications and variations are possible in light of the above teachings. It is therefore to be understood that, within the scope of the appended claims, the invention may be practiced otherwise than as specifically described. Any reference to claim elements in the singular, e.g., using the articles "a," "an," "the," or "said" is not construed as limiting the element to the singular.

What we claim is:

1. A method for making a closed-cell foam glass structure comprising:
    diffusing a substance into a porous glass substrate to form an impregnated substrate, wherein said substance is capable of forming a gas upon heating;
    sealing said impregnated glass substrate inside of a container and heating said container to a first temperature, wherein said first temperature causes said substance to form a gas and create a pressure inside of said container, wherein said pressure is greater than one atmosphere;
    heating said container to a second temperature, wherein said second temperature is higher than first temperature and causes the pores within said porous glass substrate to collapse and seal said gas within and thereby forming a solid glass, non-porous substrate;
    removing said solid glass, non-porous substrate from said container; and
    heating said solid glass, non-porous substrate to a third temperature to soften said solid glass, non-porous substrate and thereby expand said solid glass, non-porous substrate.

2. The method of claim 1 wherein said substance is a metal salt.

3. The method of claim 2 wherein said metal salt is a nitrate.

4. The method of claim 1 wherein said substance is a hydrate.

5. The method of claim 1 wherein said substance is a nitrate hydrate.

6. The method of claim 1 wherein said substance is a liquid.

7. The method of claim 6 wherein said liquid is selected from the group consisting of $H_2O$, alcohol, hydrocarbon, and substituted hydrocarbon.

8. The method of claim 1 wherein said container is a glass tube.

9. The method of claim 1 wherein said container is a fused quartz tube.

10. A method of making a closed-cell foam structure comprising:
    diffusing an inorganic salt into a porous glass substrate to form an impregnated glass substrate;
    drying said impregnated glass substrate;
    sealing said impregnated glass substrate in a container;
    heating in a first heating step said impregnated glass substrate;
    cooling said impregnated glass substrate to approximately room temperature;
    removing said impregnated glass substrate from said container;
    heating in a second heating step said impregnated glass substrate thereby forming said closed-cell foam structure.

11. The method of claim 10 wherein said porous glass substrate consists of a network of interconnected pores with diameters of approximately 40 A.

12. The method of claim 11 wherein said porous glass substrate has a void volume of approximately 30%.

13. The method of claim 12 wherein said inorganic salt is calcium nitrate tetrahydrate.

14. The method of claim 13 wherein said first heating step is at a temperature of approximately 1100 C.

15. The method of claim 14 wherein said second heating step is at a temperature of approximately 1100 C.

16. A method of making a closed-cell foam structure comprising:

preparing a first solution of $Zn(NO_3)_2 \cdot 5 H_2O$, water, and $HNO_3$;

placing a porous glass rod into said solution;

removing and drying said glass rod for about 12-24 hours;

preparing a second solution of thioacetamide, water, and $HNO_3$ wherein said thioacetamide is 2 grams, said water is 100 ml and said $HNO_3$ is 1 ml of concentrated $HNO_3$;

heating said second solution to about 100 C.;

placing said glass rod into said second solution for about 3-24 hours;

removing and drying said glass rod for about 24 hours in air;

heating in a first heating step said glass rod in a furnace at about 100 C. for about 24 hours;

placing said glass rod in a tube;

evacuating said tube to a pressure of a few millitorr and sealing said tube;

heating said tube in said furnace at about 1150 C. for about 1 hour;

cooling said tube to about room temperature;

removing said glass rod from said tube; and heating in a second heating step said glass rod in said furnace at about 1150 C. for about 10-60 minutes.

17. The method of claim 16 wherein said first solution consists of about 1 gram of said $Zn(NO_3)_2 \cdot 5 H_2O$, about 100 ml of said water, and about 1 ml of concentrated $HNO_3$; wherein said step of placing said porous glass rod into said solution is maintained for about 3-24 hours; wherein said tube is a thick-walled fused quartz tube of about 8 inches long with an inner diameter of about 0.5 inches and sealed at one end; and wherein said step of sealing said tube is by using a hydrogen-oxygen torch and wherein said step of removing said glass rod from said tube is by breaking or cutting.

18. The method of claim 16 wherein said second heating step of said glass rod in said furnace is at about 1150 C. and wherein said second heating step of said glass rod in said furnace is for about 10-60 minutes.

* * * * *